Patented Nov. 3, 1936

2,059,448

UNITED STATES PATENT OFFICE 2,059,448

RUBBER AND METHOD OF MAKING THE SAME

Albert K. Epstein and Benjamin R. Harris, Chicago, Ill.

No Drawing. Application February 16, 1935, Serial No. 6,856

13 Claims. (Cl. 106—23)

Our invention relates to an improved rubber composition and a method of making the same.

In the production of so-called rubber articles it is customary to mill or calender together a proportion of raw rubber such as rubber crepe with a quantity of old rubber such as reclaimed rubber, trimmings, cuttings and the like, together with various types of fillers and coloring materials. The order of mixing sometimes varies, but in general the purpose is to form a plastic, intimate mixture of the various constituents such as to facilitate further treatment. This so-called rubber magma is relatively heavy and results in the entrapping of relatively large quantities of air.

The principal object of our invention is the provision of an improved rubber composition.

Another object is the addition of a dispersing emollient, softening and plasticizing agent to the rubber.

Another object is to utilize in rubber compositions an improved class of materials, the presence of which in the rubber composition will produce improved results.

In order to facilitate the dispersion of the various ingredients used, such as clay, pigment, carbon black, scrap, accelerators, antioxidants and other addition agents into the rubber magma, and to secure other advantages, we have discovered that certain organic compounds containing a lipophile group wetted by the rubber and a hydrophile group wetted by other constituents aid in the production of an improved rubber product. Our addition agents also plasticize and soften the rubber, thus improving its properties.

The materials which we employ are either acyl or alkyl derivatives of polyhydroxy substances such as glycerine, glycols, polyglycerols and polyglycols, sugars, and sugar alcohols, the derivatives having at least one free hydroxy group.

A very suitable class of substances coming within the broad class of the higher fatty acid esters of the polyhydroxy substances listed are, for example, monostearin, mono-olein, commercial mixtures of monostearin and mono-olein, glycerine esters and mixtures of higher fatty acid esters of mono-acid di-glycerides and mixtures of fatty acid esters of glycerine and glycols with free unesterified OH groups, prepared from cocoanut oil fatty acids, mono-stearylglycol, mono-oleyl diethylene glycol, monostearylester of a mixture of polyglycerols; mono-oleic acid ester of a mixture of polyglycerols and the like. The alkyl ethers can also be used to good advantage, such as mono-cetyl ether of glycerine, mono-oleylether of ethylene glycol and other ethers of higher aliphatic alcohols and polyphydroxy substances of the general character enumerated. Mixtures of various esters and ethers produce good results such as mixed fatty acid monoesters of glycerine, mixed fatty acid esters of polyglycerols and the like.

Although favorable results attend the use of substances wherein only one hydroxy group is replaced by an acyl or alkyl group, it is not to be understood that we are limited to the use of this particular class of substances. We have found that esters and ethers of polyhydroxy substances in which more than one hydroxy group is replaced by a relatively high molecular weight acyl or alkyl group can be used to good advantage providing there is at least one unesterified free hydroxy group. Examples of this class of substances are distearin, diolein and dioleyl diglycerol and various mixtures of fatty acid esters.

Although pure compounds of the character described can be employed we find that for general purposes mixtures are not only more readily made but in many cases seem to offer certain advantages in actual practice. For example, we may take commercial fatty acids, such as commercial stearic acid which contains proportions of both oleic acid and palmitic acid, and esterify polyhydroxy substances therewith in such a manner as to produce a mixture of fatty acid esters of the polyhydroxy substance in which at least one free hydroxy group is left unesterified.

We can also take mixtures of fatty acids derived from and normally present in various vegetable and animal oils such as the mixed fatty acids derived from cottonseed oil, corn oil, peanut oil, lard, cocoanut oil, palm oil, castor oil, fish oils of various kinds such as sardine oil, codliver oil and the like, and employ such mixed fatty acids with polyhydroxy substances to produce mono- or di-esters or the like containing at least one free hydroxy group. Thus, for example, the mixed fatty acids are esterified with glycerine and a mixture of mono- and di-glycerides may be obtained, or such fatty acids may be esterified with a polyglycerol mixture in which case a mixture of mixed polyglycerides and fatty acid esters is obtained, all containing free hydroxy groups.

We may also produce our products by direct reesterification of an oil or fat with glycerine or polyglycerol, employing a relatively small amount of alkali as a catalyst to facilitate the reaction. Sodium hydroxide used in amounts ranging from one-tenth to one per cent or slightly more may be employed with good results. The alkali used may be neutralized with a relatively strong acid, for example, hydrochloric acid, care being taken not to employ enough acid to leave an appreciable excess.

We have discovered that when substances of the class disclosed are used in proportions of between approximately one-half per cent and ten percent, or even more in the process of milling rubber, valuable results are obtained. When employing larger quantities of these substances, it is preferable that a type of substance be employed having a relatively high melting point in order to avoid excessive softening of the product.

As a specific example of carrying out our invention we may introduce three pounds of commercial monostearin containing also admixtures of mono-palmitin and sometimes smaller proportions of other fatty acid monoglycerides into 100 pounds of crepe rubber, and mill the same together until a homogeneous plastic mass is produced. Approximately 40% of this plastic product is then milled with old rubber, such as cuttings, factory trimmings, and the like, together with fillers and/or coloring matter such as zinc oxide, titanium oxide or carbon black and other fillers such as clay and coloring materials ordinarily employed to make a 100-pound batch. We may also vary the method of mixing, as for example, we may first mill a suitable amount of crepe rubber and then add to it a proportion of three pounds of one of our addition substances, such as, for example, commercial monostearine together with a relatively large proportion of reclaimed rubber, or old rubber, factory trimmings and scraps, and mill the mass together with other addition agents used in the manufacture of rubber to make a 100-pound batch.

The use of our addition substances aids the action of antioxidants, accelerators and other materials of the same general character sometimes employed in making rubber. Our addition agents facilitate the even distribution of antioxidants and accelerators of types often employed, as well as the incorporation and distribution of dyes, pigments and other substances.

We have discovered that some of our addition substances of the type described not only act as softeners and produce other advantageous results, but also in a manner act as anti-oxidants. While all of the substances seem to have some anti-oxidant effect, those which contain a relatively large number of free hydroxy groups have a more decided antioxidant action. The polyglyceride derivatives, for example, are valuable in this connection.

It is to be understood that we are not limited in the amount of our addition agents used, the amount employed being in sufficient proportion to plasticize the rubber and produce the desired results. The relatively harder materials may be used in greater proportions. Thus, for example, eight percent of monostearin may be employed in some rubber compounds without detrimental results to the rubber but with definite advantages in softening and plasticizing the rubber mass, in securing even distribution of all ingredients, in avoiding the trapping of excessive quantities of air and in general improving the final vulcanized product. 3% of commercial stearic acid ester of polyglycerol of an average molecular weight of between 160 and 180 (of the polyglycerol) is found satisfactory in some rubber mixes.

With further reference to the substances used in accordance with our invention, we may use a relatively high molecular weight acyl or alkyl derivative of polyhydroxy substances wherein the derivative has at least one free hydroxy group. Glycerine, glycols, polyglycerols, polyglycols and sugars are very suitable as polyhydroxy substances employed in forming the derivatives of our invention. The polyglycerols particularly are valuable. The polyglycerols from which the polyglycerides are produced may be prepared in various manners to produce various polymerized products with various amounts of hydroxy groups present. Thus we may use polyglycerols having an average molecular weight of 150 varying up to 300. The alkyl and acyl groups which we employ may be derived from oils and fats or they may be of naphthenic character and derived from mineral oil, but such groups should be of relatively high molecular weight, those having at least 12 carbons in their molecular structure being preferred. Compounds containing acyl groups of oils or fats may be prepared by re-esterification methods, or by saponifying the oil or fat and decomposing the soap with a relatively strong acid to produce free fatty acids or by hydrolytic splitting. Free fatty acids may be used as such, or the higher molecular weight constituents may be separated, in either case the polyhydroxy substance being esterified with the free fatty acids. The free fatty acids may be catalytically reduced to form the alcohols as a source of alkyl groups, or any other suitable source of alkyl groups may be utilized. The free OH group of the compounds is attached to a carbon of the polyhydroxy substance.

By the term "rubber" used in the claims we include natural and synthetic rubber, gutta percha, balata and reclaimed rubber, such as factory trimmings and the like. In the term "filler" we include not only substances which have only a filling function, but other substances which, in addition to a filling function may have a coloring function, or the like. Such substances which may have two functions in the rubber mass are zinc oxide and other metal oxides and salts and other materials of the same general type. The term "poly" is employed to mean more than one.

What we claim as new and desire to protect by Letters Patent of the United States is:

1. A compounded, milled rubber composition including rubber and a relatively small proportion of a derivative of an aliphatic polyhydroxy substance having at least one relatively high molecular weight alkyl or acyl group and at least one free hydroxy group attached to a carbon of the polyhydroxy substance.

2. A compounded, milled rubber composition including rubber and a relatively small proportion of a relatively high molecular weight fatty acid ester of an aliphatic polyhydroxy substance, said ester having at least one free hydroxy group attached to a carbon of the polyhydroxy substance.

3. A compounded, milled rubber composition including rubber and a relatively small proportion of an ester of a fatty acid having at least twelve carbon atoms, and an aliphatic polyhydroxy substance, the ester having at least one free hydroxy group attached to a carbon of the polyhydroxy substance.

4. A compounded, milled rubber composition including rubber and a relatively small proportion of a derivative of a water soluble aliphatic polyhydroxy substance having at least one relatively high molecular weight alkyl or acyl group and at least one free hydroxy group attached to a carbon of the polyhydroxy substance.

5. A compounded, milled rubber composition including rubber, filler material and a relatively small proportion of a relatively high molecular weight fatty acid ester of an aliphatic polyhydroxy substance, the ester having at least one free hydroxy group attached to a carbon of the polyhydroxy substance.

6. A rubber composition including rubber and a relatively small proportion of a relatively high molecular weight fatty acid polyglyceride having at least one free hydroxy group attached to a carbon of the polyhydroxy substance.

7. A rubber composition including rubber and a relatively small proportion of a relatively high molecular weight fatty acid polyglyceride having more than two free hydroxy groups attached to a carbon of the polyhydroxy substance.

8. A rubber composition including rubber, a filler material and a relatively small proportion of a relatively high molecular weight fatty acid polyglyceride having at least one free hydroxy group attached to a carbon of the polyhydroxy substance.

9. The method of improving a rubber composition, which comprises milling into said rubber composition a relatively small proportion of a relatively high molecular weight fatty acid ester of a polyglycerol, the ester having at least one free hydroxy group attached to a carbon of the polyhydroxy substance.

10. A rubber composition including rubber and a relatively small proportion of an addition substance comprising a relatively high molecular weight alkyl derivative of a polyhydroxy substance of the class consisting of glycerine, glycols, polyglycerols, polyglycols, sugars, and sugar alcohols, there being at least one free hydroxy group attached to a carbon of the polyhydroxy substance.

11. A rubber composition including rubber and a relatively small proportion of a mixture of polyglycerides having a relatively large number of free hydroxy groups attached to carbons of the polyglycerols and constituting the reaction product of free fatty acids and an excess of polyglycerols.

12. The method of improving a rubber composition which comprises milling into a rubber composition a relatively small proportion of a derivative of an aliphatic polyhydroxy substance having at least one relatively high molecular weight alkyl or acyl group and at least one free hydroxy group attached to a carbon of the polyhydroxy substance, whereby a compounded, milled rubber composition is produced.

13. The method of improving a rubber composition which comprises milling into said rubber composition a relatively small proportion of a relatively high molecular weight fatty acid ester of an aliphatic polyhydroxy substance, said ester having at least one free hydroxy group attached to a carbon of the polyhydroxy substance, whereby a compounded, milled rubber composition is produced.

ALBERT K. EPSTEIN.
BENJAMIN R. HARRIS.